United States Patent
Easley et al.

(10) Patent No.: US 7,577,296 B2
(45) Date of Patent: Aug. 18, 2009

(54) SYSTEM AND METHOD FOR EVALUATING LASER PROJECTION EQUIPMENT

(75) Inventors: Samuel J. Easley, St. Louis, MO (US); Philip L. Freeman, Maryland Heights, MO (US); Jeffrey J. Luner, Collinsville, IL (US)

(73) Assignee: The Boeing Company, Chicago, IL (US)

( * ) Notice: Subject to any disclaimer, the term of this patent is extended or adjusted under 35 U.S.C. 154(b) by 749 days.

(21) Appl. No.: 10/769,065

(22) Filed: Jan. 30, 2004

(65) Prior Publication Data

US 2005/0171707 A1 Aug. 4, 2005

(51) Int. Cl.
*G06K 9/00* (2006.01)
*G06K 9/48* (2006.01)
*G06K 9/40* (2006.01)
*G06K 9/32* (2006.01)
*G03B 21/14* (2006.01)

(52) U.S. Cl. .............. 382/181; 382/141; 382/199; 382/260; 382/293; 353/69

(58) Field of Classification Search ............ 353/69; 382/199, 260, 181, 141, 293
See application file for complete search history.

(56) References Cited

U.S. PATENT DOCUMENTS

| | | | | | |
|---|---|---|---|---|---|
| 4,713,537 | A | * | 12/1987 | Kunz et al. | 250/252.1 |
| 5,111,513 | A | * | 5/1992 | Turner et al. | 382/100 |
| 5,381,258 | A | * | 1/1995 | Bordignon et al. | 359/202.1 |
| 5,387,958 | A | * | 2/1995 | Pashley | 396/457 |
| 5,999,281 | A | * | 12/1999 | Abbott et al. | 359/15 |
| 6,067,152 | A | | 5/2000 | Rando | 356/152.1 |
| 6,219,099 | B1 | * | 4/2001 | Johnson et al. | 348/383 |
| 6,414,789 | B2 | * | 7/2002 | Braun | 359/460 |
| 6,499,846 | B1 | * | 12/2002 | Hiller et al. | 353/50 |
| 6,529,253 | B1 | * | 3/2003 | Matsute | 349/96 |
| 6,670,603 | B2 | * | 12/2003 | Shimada et al. | 250/235 |
| 6,704,000 | B2 | * | 3/2004 | Carpenter | 345/158 |
| 6,771,307 | B2 | * | 8/2004 | Waki et al. | 348/189 |
| 6,794,205 | B2 | * | 9/2004 | Han et al. | 438/15 |
| 6,808,270 | B2 | * | 10/2004 | Nelson et al. | 353/69 |
| 6,846,081 | B2 | * | 1/2005 | Mochizuki et al. | 353/70 |
| 6,922,232 | B2 | * | 7/2005 | Farnsworth | 356/121 |
| 6,988,339 | B2 | * | 1/2006 | Pylkki et al. | 52/173.3 |
| 7,001,375 | B2 | * | 2/2006 | Yee et al. | 606/5 |
| 7,123,750 | B2 | * | 10/2006 | Lu et al. | 382/110 |
| 7,142,312 | B2 | * | 11/2006 | Quadling et al. | 356/602 |
| 2005/0179825 | A1 | * | 8/2005 | Hicks | 348/745 |

OTHER PUBLICATIONS

"Grit and Microgrit Grading Conversion Chart." Reade Advanced Materials. 1997. Reade Advanced Materials. Jun. 13, 2007 <http://www.reade.com/Sieve/grit_conversion.html>.*
Tsai, Roger Y. "A Versatile Camera Calibration Technique for High-Accuracy 3D Machine Vision Metrology Using Off-the-Shelf TV Cameras and Lenses." IEEE Journal of Robotics and Automation 4(1987): 323-344.*

* cited by examiner

*Primary Examiner*—Matthew C Bella
*Assistant Examiner*—Michael A Newman
(74) *Attorney, Agent, or Firm*—Toler Law Group (57) ABSTRACT

Systems and methods are provided for evaluating performance of a projector. An imaging screen is configured to produce an image of a pattern projected thereon. A camera is configured to capture and digitize the image of the pattern projected on the imaging screen. An image analyzer is configured to receive the digitized image from the camera and to analyze the received digitized image.

21 Claims, 9 Drawing Sheets

SYSTEM AND METHOD FOR EVALUATING LASER PROJECTION EQUIPMENT

FIELD OF THE INVENTION

This invention relates generally to imaging and, more specifically, to image analysis.

BACKGROUND OF THE INVENTION

Laser projectors are frequently used in manufacturing operations. In a typical operation, a laser projector generates a laser beam that is steered by galvanometers to trace a pattern onto a surface. The pattern may project an outline of a part or other features as desired.

The pattern may be used to locate a part or assembly for placement or to locate features where an operation is to be performed. For example, a laser projector may be used to identify a location for drilling a hole or for determining whether a hole or some other feature is present.

Such manufacturing operations typically entail close tolerances and high levels of precision and accuracy. However, precision and accuracy of laser projectors may be affected by environmental conditions or problems within the laser projector itself. For example, the laser beam projected from a laser projector may drift due to changes in the thermal environment, such as ambient air temperature, in which the laser projector is being used. Further, galvanometers within the laser projector that steer the laser beam may occasionally need tuning. Also, it would be desirable to determine accuracy of the laser projector.

However, there is an unmet need in the art for a system and method for evaluating performance of a laser projector.

SUMMARY OF THE INVENTION

Embodiments of the present invention provide systems and methods for evaluating performance of a projector. Exemplary embodiments of the present invention are well-suited for diagnosing problems and performance-related issues with laser projection systems. For example, drift due to thermal environment changes can be determined; accuracy of the projector can be determined; or galvanometers used for steering a laser beam can be tuned.

According to an exemplary embodiment of the present invention, an imaging screen is configured to produce an image of a pattern projected thereon. A camera is configured to capture and digitize the image of the pattern projected on the imaging screen. An image analyzer is configured to receive the digitized image from the camera and to analyze the received digitized image.

According to an aspect of the present invention, the imaging screen may include a pane of glass having a first surface that is grit blasted and a second surface that is not grit blasted. Alternately, the imaging screen may include a holographic filter.

According to another aspect of the present invention, a filter may be interposed between the imaging screen and the camera. The filter may include a neutral filter. Alternately, the filter may include a passband filter.

According to a further aspect of the present invention, a lens may be interposed between the imaging screen and the camera. In one embodiment, the lens may be interposed between the imaging screen and the filter. In other embodiments, the lens may be interposed between the filter and the camera.

According to still another aspect of the present invention, the camera may include a charge coupled device (CCD) chip. Alternately, the camera may include a complementary metal-oxide-silicon (CMOS) chip.

According to yet another aspect of the present invention, the image analyzer may be configured to detect edges of the image.

BRIEF DESCRIPTION OF THE DRAWINGS

The preferred and alternative embodiments of the present invention are described in detail below with reference to the following drawings.

DETAILED DESCRIPTION OF THE INVENTION

By way of non-limiting overview, embodiments of the present invention provide systems and methods for evaluating performance of a projector. According to an exemplary embodiment of the present invention, an imaging screen is configured to produce an image of a pattern projected thereon. A camera is configured to capture and digitize the image of the pattern projected on the imaging screen. An image analyzer is configured to receive the digitized image from the camera and to analyze the received digitized image. Details of several embodiments will now be set forth below.

Figure 1:
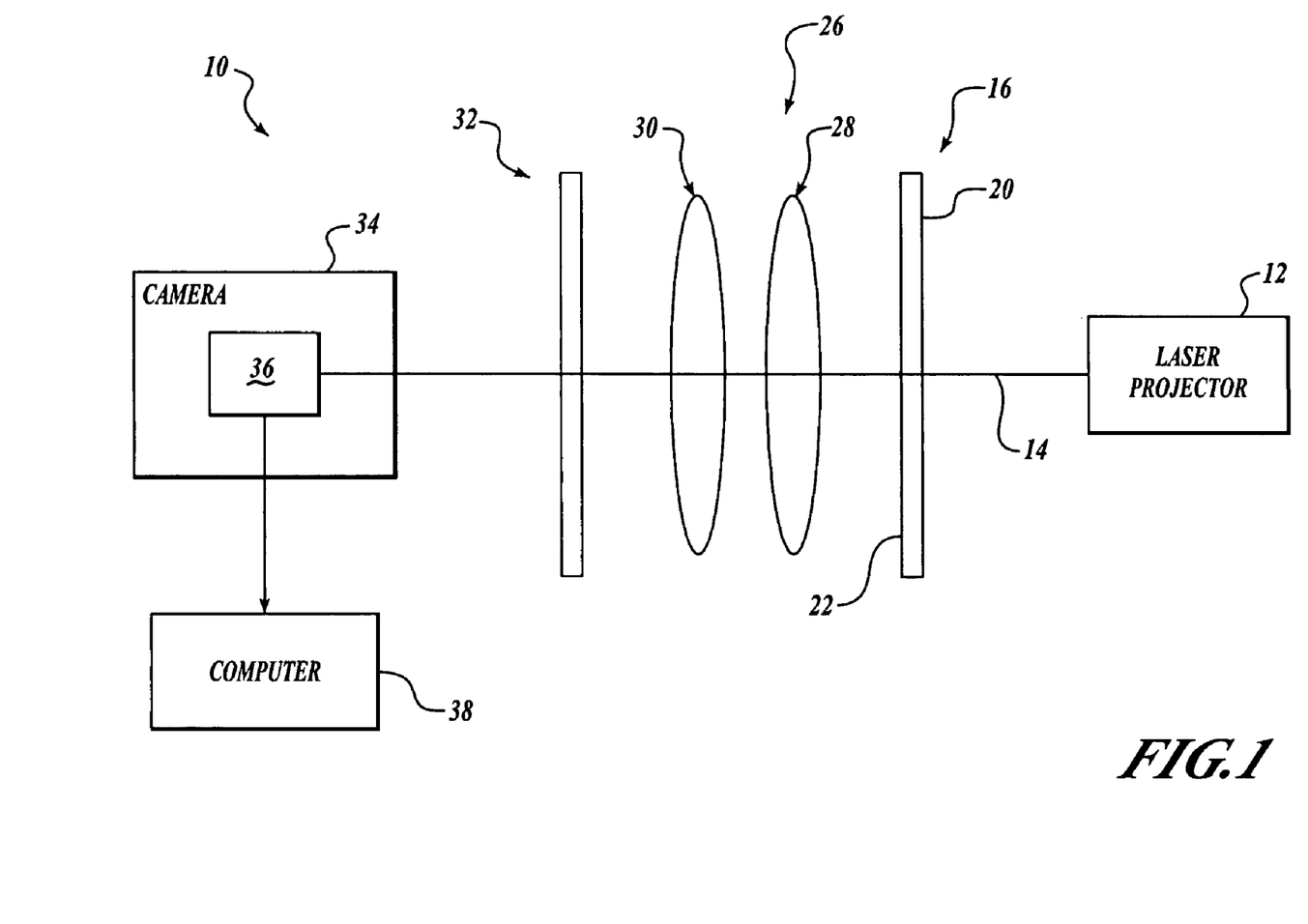
FIG. 1 is a block diagram of an exemplary system according to an embodiment of the present invention.

Referring now to FIG. 1, an exemplary system 10 according to a non-limiting embodiment of the present invention evaluates performance of a laser projector 12. As such, the laser projector 12 is considered a unit under test ("UUT") rather than a component of the system 10. As a UUT, the laser projector 12 suitably may be any laser projector known in the art. Given by way of non-limiting example, the laser projector 12 may be a commercially available laser projector manufactured by Laser Projection Technologies, Inc. Because laser projectors are well known in the art, details of construction and operation of the laser projector 12 are not necessary for an understanding of the present invention. In general, as is known, the laser projector 12 generates a laser beam 14 having a frequency within the visible light spectrum, such as a beam of green light having a frequency around 532 nm. However, it will be appreciated that the laser beam 14 may have any frequencies as desired within the visible light spectrum. As is also known, the laser beam 14 is swept by galvanometers (not shown) within the laser projector 12 that trace the laser beam 14 into a pattern as desired for a particular application. Given by way of non-limiting example, the pattern traced by the laser beam 14 may define an outline of a part for placement, may indicate location of a hole for drilling, or the like. Further details regarding tracing the pattern are discussed below with reference to FIG. 2.

Figure 2:
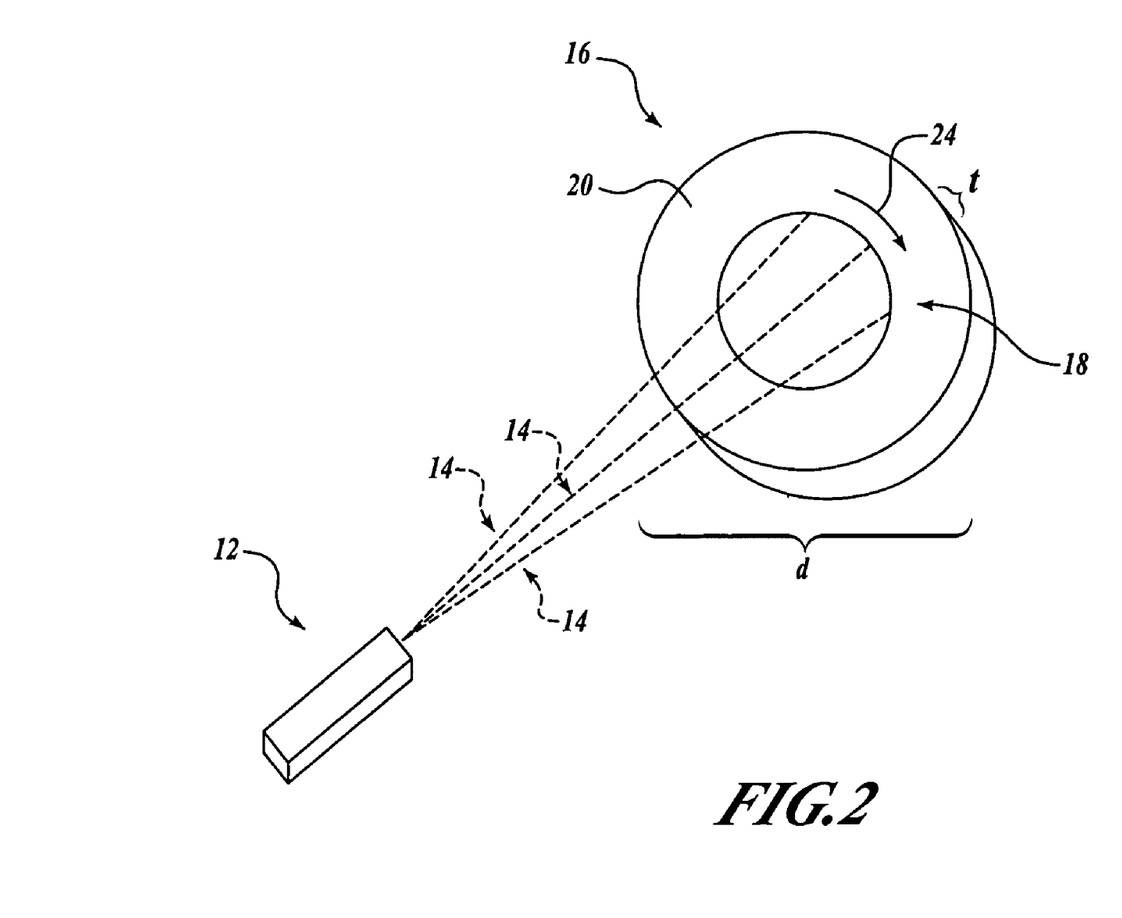
FIGS. 2 and 3 are perspective views of generating an image of a pattern on an imaging screen.

Referring now to FIGS. 1 and 2, an imaging screen 16 advantageously provides a translucent medium onto which an image 18 of the pattern traced by the laser beam 14 can fall. In one embodiment, the imaging screen 16 suitably is a thin plate of glass. The plate of glass has a surface 20 that is substantially uniformly grit blasted or sandblasted. The surface 20 suitably is grit blasted with around 220 grit. However, it will be appreciated that any grit can be used as desired for a particular application. Another surface 22 of the imaging screen 16 is not grit blasted. As a result, the surface 20 renders the imaging screen 16 translucent. That is, the imaging screen 16 can be seen through and the image 18 can fall on the imaging screen 16. To that end, the imaging screen 16 acts as a diffusing filter that provides around 180° diffusion. Thus, the image 18 can be viewed on the surface 20 or the surface 22 from substantially any angle.

Figure 3:
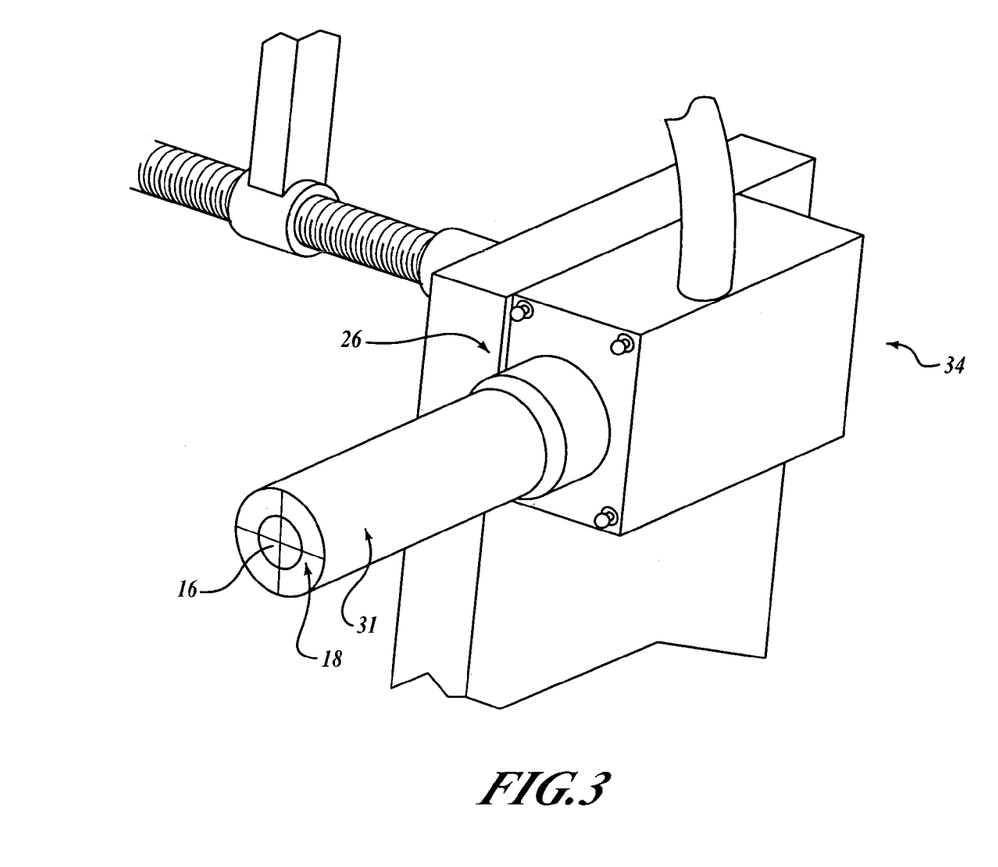

The pattern traced by the laser beam 14 is projected onto the surface 20. In a known manner, the laser projector 12 generates the laser beam 14. Galvanometers (not shown) in the laser projector 12 steer the laser beam 14 in a direction indicated by an arrow 24. The laser beam 14 is steered in directions to trace an outline of a part as desired for a particular application. Given by way of non-limiting example, the image 18 shown in FIG. 2 is a circle that may represent a location of a hole to be drilled. Referring briefly to FIG. 3 and given by way of further non-limiting example, the image 18 may be a cross-hair such as that used for determining performance characteristics of the laser projector 12 (FIGS. 1 and 2), as will be explained below. However, it will be appreciated that the image 18 may have any shape as desired for a particular application.

Referring back to FIGS. 1 and 2, when the imaging screen 16 is embodied as a plate of glass, the plate of glass has a diameter d and a thickness t. Given by way of non-limiting example, the diameter d may be around 15 mm and the thickness t may be around 1 mm. However, it will be appreciated that the plate of glass may have any diameter and thickness as desired for a particular application. As is known, increased thickness of the imaging screen 16 results in increased refraction. Therefore, an idealized imaging screen 16 would be infinitesimally thin. That is, the thickness t would approach zero. Accordingly, in another embodiment in which the imaging screen 16 has a very thin thickness t, the imaging screen 16 may be provided as a holographic filter. It will be appreciated that providing the imaging screen 16 as a holographic filter results in less refraction than providing the imaging screen 16 as a plate of glass. However, embodying the imaging screen 16 as a plate of glass entails substantially lower costs than does a holographic filter.

Referring now to FIGS. 1 and 3, optics 26 focus and/or magnify the image of the pattern as desired. The optics 26 includes at least one lens 28. If desired, the optics 26 may include a lens 30 or additional lenses (not shown). The optics 26 may include an electronic shutter that remains open long enough for the laser beam 14 to be integrated. The optics 26 suitably focuses the image of the pattern and, if desired, magnifies the image of the pattern. In one presently preferred embodiment, the optics 26 provides approximately 1× magnification. As will be discussed below in the context of image analysis, 1× magnification simplifies processing for image analysis. However, it will be appreciated that any magnification may be performed as desired for a particular application. It will be understood that magnification other than 1× entails programming image analysis software (discussed below) to compensate for magnification other than 1×. The optics 26 suitably may be provided in the form of any acceptable commercial-off-the-shelf (COTS) lens, such as without limitation an Infiniti Optics lens model number InfiniStix 144100. If desired, a substantially leak-proof cylinder 31 houses the imaging screen at one end of the cylinder 31 and is attached to the optics 26 at another end of the cylinder 31. If provided, the cylinder 31 reduces noise, thereby increasing signal-to-noise ratio (SNR).

Referring back to FIG. 1, an optional filter 32 attenuates the image of the pattern if the image of the pattern has an intensity sufficient to saturate image processing (explained below). In this exemplary embodiment, the filter 32 suitably is a neutral filter. That is, the filter 32 nearly uniformly attenuates substantially all wavelengths within the visible light spectrum without a preference for any predetermined wavelengths. A neutral filter is well suited for the system 10 because attenuating substantially all wavelengths across the visible light spectrum increases signal-to-noise ratio (SNR) of the system 10. In one exemplary embodiment, the filter 32 suitably is a metallized filter that reflects back toward the imaging screen 16 most of the light received by the filter 32 and transmits for subsequent image analysis only a portion of the light received. In one exemplary embodiment given by way of non-limiting example, the filter 32 has an attenuation factor or density of around 3.0. However, it will be appreciated that the filter 32 may have any attenuation factor whatsoever as desired for a particular application.

Referring now to FIGS. 1 and 3, the light from the optics 26 and, if provided, the filter 32 is provided to a camera 34. The camera 34 suitably is any acceptable digital camera that captures an image and digitizes the captured image. The camera 34 includes a chip 36, such as a charge-coupled-device (CCD) chip or a complementary metal oxide semiconductor (CMOS) chip. Given by way of non-limiting example, the camera 34 suitably is a DVT model number 630 digital camera with a CCD chip or a JAI model number CV-A1 digital camera. However, it will be appreciated that the camera 34 may be any type of camera as desired for a particular application. For example, the camera 34 may be a digital measuring microscope. In an alternate embodiment, the camera 34 is a film camera. In this alternate embodiment, film from the camera 34 is developed and is later analyzed for determining performance characteristics of the projector 12.

A computer 38 receives output from the camera 34. The computer 38 suitably is any acceptable computer that is known in the art, such as without limitation a desktop computer, a laptop computer, a palmtop computer, a mainframe computer, a workstation, a personal digital assistant, or the like. The computer 38 executes suitable image analysis software routines that are configured to determine performance characteristics of the projector 12. For example, acceptable image processing software includes commercial-off-the-shelf edge detection software, such as Thresholding, Sobel filtering, Canny edge detector, or the like. In this case, data from detection of an edge indicates location or position of the pattern. The image analysis software typically may be configured to analyze images with a magnification of 1. However, it will be appreciated that any magnification may be performed by the optics 26. When the optics 26 magnifies light with a magnification other than 1, the image analysis software is suitably programmed in a manner known to those skilled in the art to compensate for the magnification.

While FIG. 1 shows the projector 12, the imaging screen 16, the optics 26, the filter 32, and the camera 34 as being collinear, it will be appreciated that this need not be the case. As described above, the imaging screen 16 acts as a diffusing filter that provides around 180° diffusion. Thus, the image 18 can be viewed on the surface 20 or the surface 22 from substantially any angle. Therefore, the projector 12, the imaging screen 16, the optics 26, the filter 32, and the camera 34 need not be collinear and in one embodiment are non-collinear.

Figure 4:
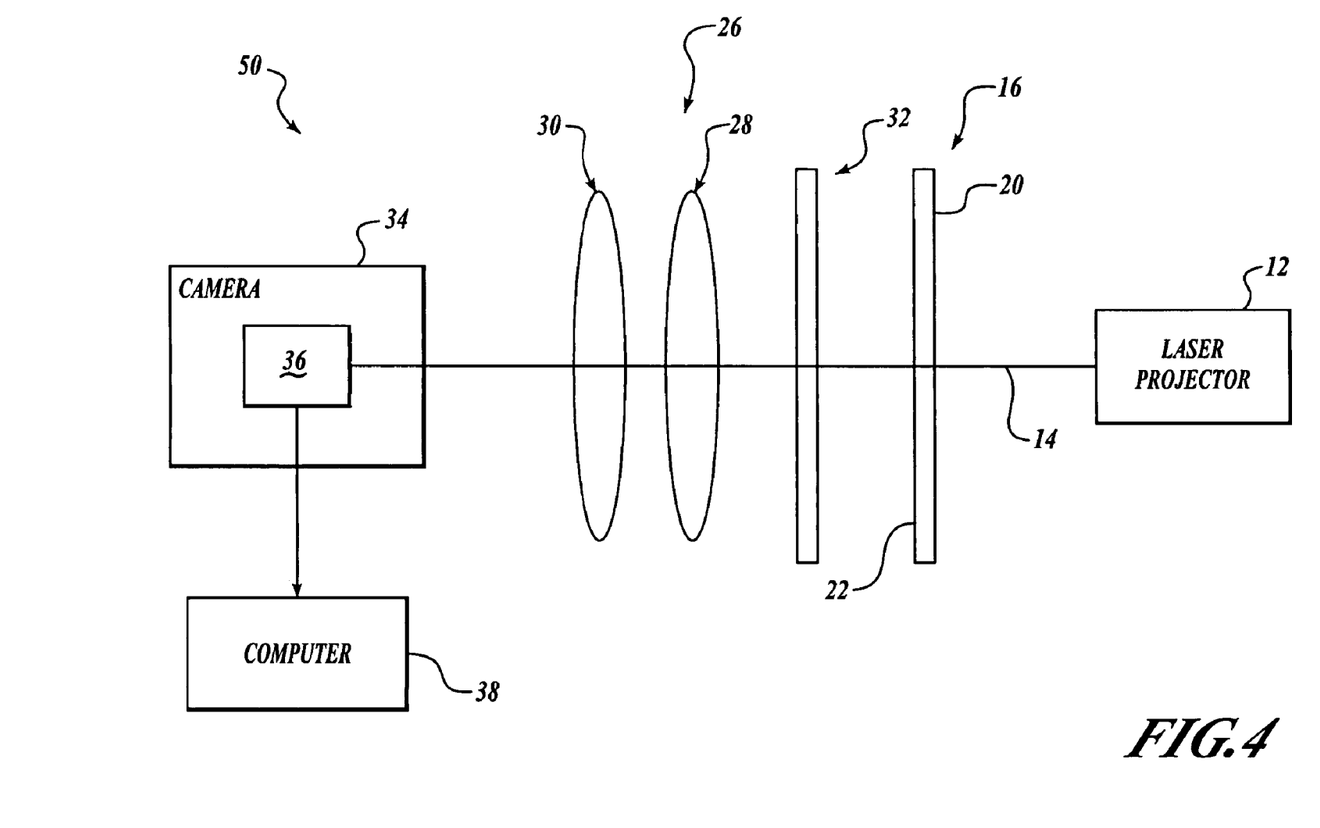
FIGS. 4-6 are block diagrams of exemplary systems according to other embodiments of the present invention.

Alternate embodiments of the present invention provide flexibility in selection and/or placement of optical elements and filters. Advantageously, it does not matter whether the light from the imaging screen 16 passes first through the optics 26 and is then filtered (as in the system 10) or whether the light from the imaging screen 16 is first filtered and then passes through the optics 26 (as in the alternate embodiments discussed below). Referring now to FIG. 4, a system 50 includes all components of the system 10 (FIG. 1). However, the optics 26 is interposed between the filter 32 and the camera 34. That is, the light from the imaging screen 16 is first filtered by the filter 32 and then passes through the optics 26.

Figure 5:
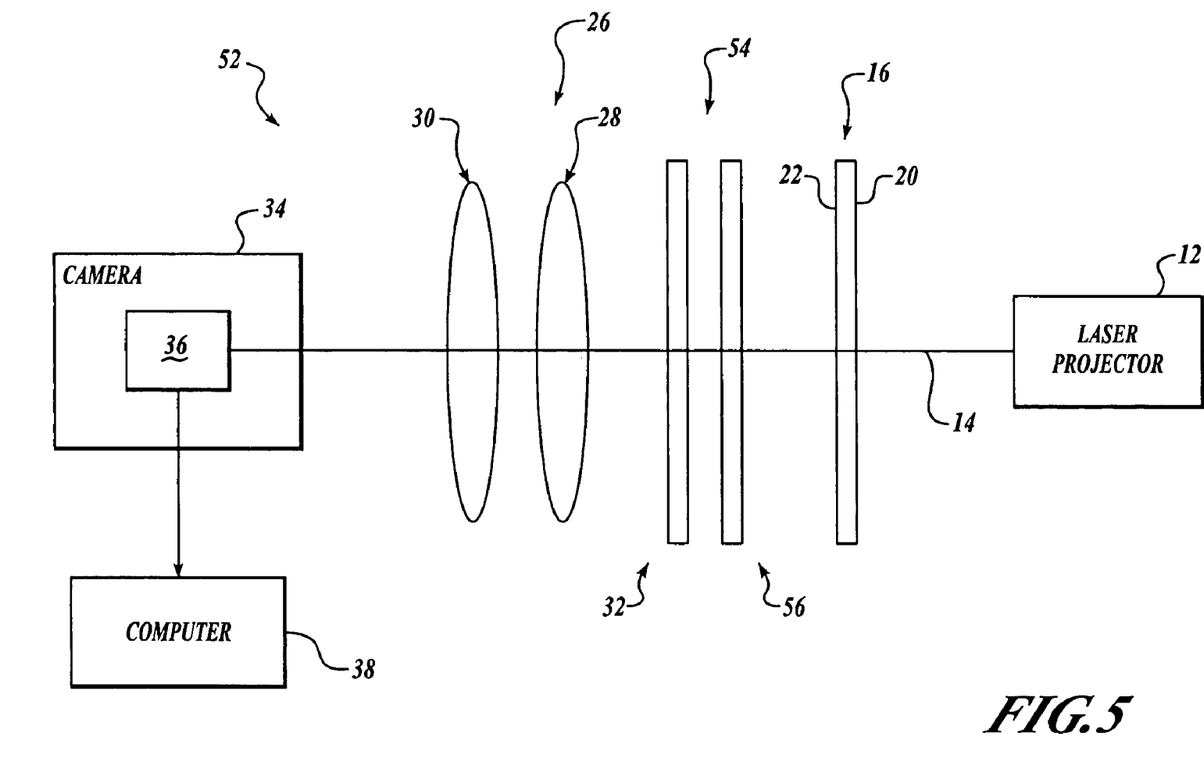

Referring now to FIG. 5, a system 52 provides additional filtering. As in the system 50 (FIG. 4), in the system 52 the light from the imaging screen 16 is first filtered and then passes through the optics 26. Filters 54 include a passband filter 56 and the neutral filter 32. The passband filter has a frequency response selected such that (i) a band of frequencies making up the laser beam 14 is allowed to pass through the passband filter 56 and (ii) frequencies are attenuated that are outside the band of frequencies that make up the laser beam 14. Attenuating frequencies outside those making up the laser beam 14 reduces noise, thereby increasing SNR. In this exemplary embodiment, light from the imaging screen 16 is first filtered by the passband filter 56 and is then filtered by the neutral filter 32.

However, it will be appreciated that the order of filtering does not matter. For example, referring now to FIG. 6, a system 58 also includes the neutral filter 32 and the passband filter 56. However, in this exemplary alternate embodiment, light from the imaging screen 16 is first filtered by the neutral filter 32 and is then filtered by the passband filter 56.

Figure 6:
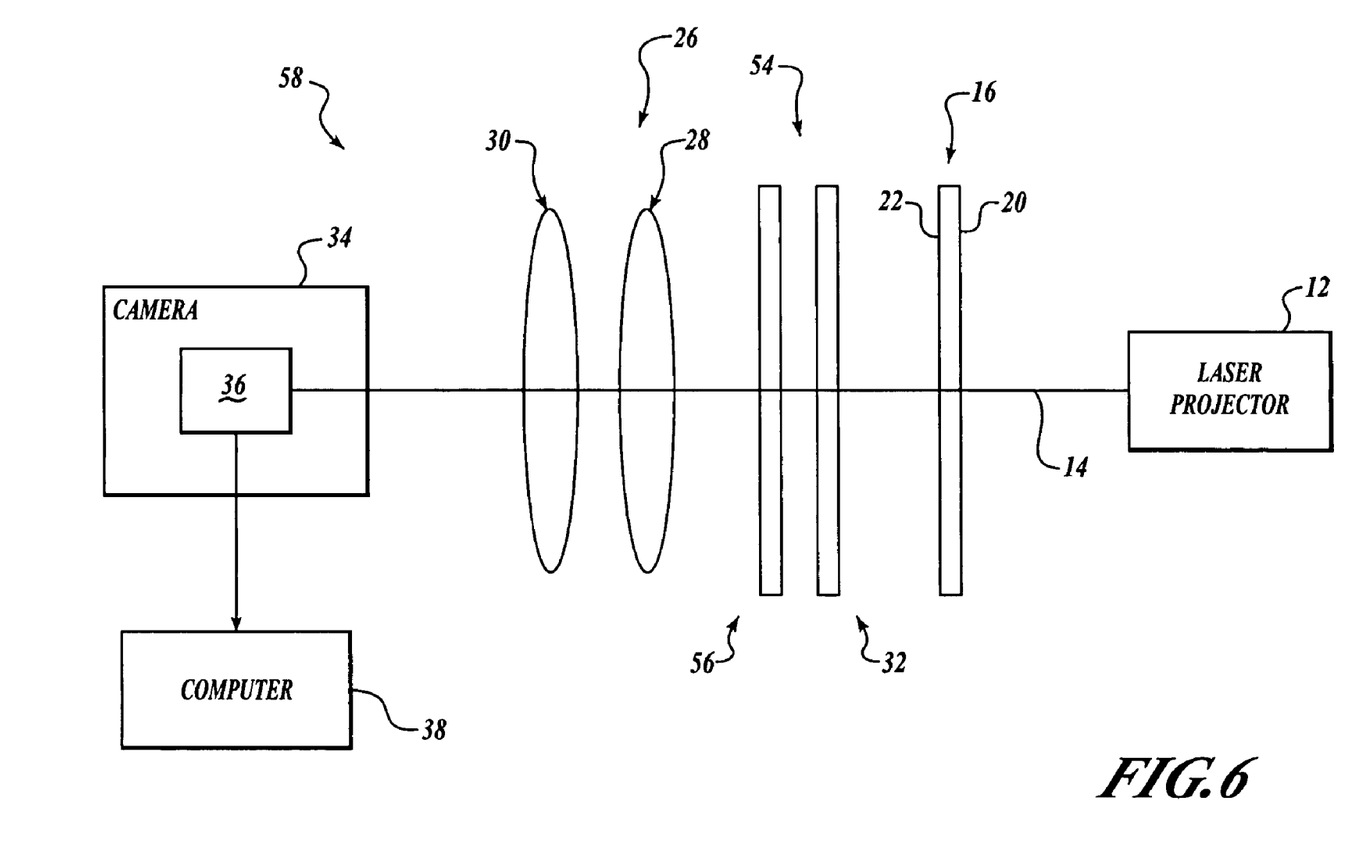
Figure 7:
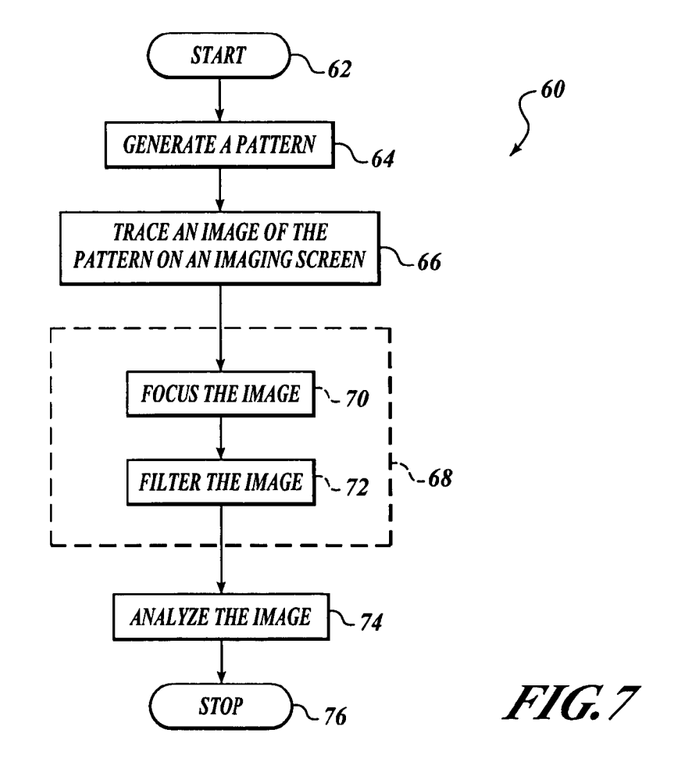
FIG. 7 is a flow chart of a method according to an embodiment of the present invention.

Referring now to FIG. 7, a routine 60 evaluates performance of a projector. Advantageously, the routine 60 suitably is executed by any of the exemplary systems 10 (FIG. 1), 50 (FIG. 4), 52 (FIG. 5), or 58 (FIG. 6). The routine 60 starts at a block 62.

At a block 64, a pattern is generated by a projector, such as a laser projector. The pattern is generated in a known manner, such as by generating a laser beam and steering the laser beam in a shape of the pattern by galvanometers.

At a block 66, an image of the pattern is traced on an imaging screen, such as a plate of grit-blasted glass or a holographic filter or the like.

At a block 68, light from the image is focused and filtered. In one embodiment, within the block 68 first the light is focused and, if desired, magnified at a block 70 and then at a block 72 the focused and optionally magnified light is filtered. It will be appreciated that this processing scheme is performed by the system 10 (FIG. 1).

In another embodiment, within the block 68 first the light is filtered at the block 72 and then at the block 70 the filtered image is focused and, optionally, magnified. It will be appreciated that this alternate processing scheme is performed by the systems 50 (FIG. 4), 52 (FIG. 5), and 58 (FIG. 6).

At a block 74, the image is analyzed. As described above, in one embodiment the image is processed by edge detection software executed on the computer 38. In this embodiment, data from detection of an edge indicates location or position of the pattern. As also described above, when the optics 26 magnifies light with a magnification other than 1, the image analysis software is suitably programmed in a manner known to those skilled in the art to compensate for the magnification. Exemplary, non-limiting analyses performed on the image using positional information obtained at the block 74 will be discussed below with reference to FIGS. 8-10. It will be appreciated that the types of measurements explained with reference to FIGS. 8-10 are given by way of non-limiting example only and are not intended to be all-inclusive.

The routine 60 ends at a block 76.

Figure 8:
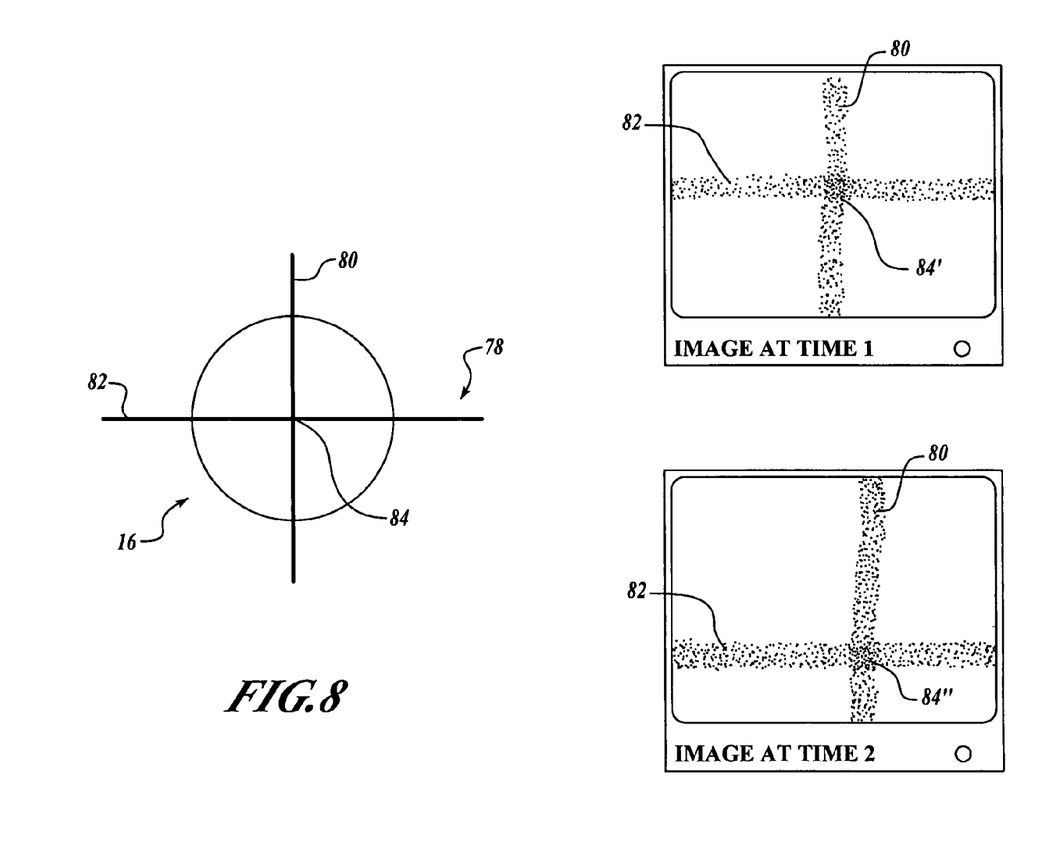
FIGS. 8-10 illustrate examples of test patterns for determining performance characteristics of a projector.

Referring now to FIG. 8, a cross-hair pattern 78 is displayed on the imaging screen 16. The cross-hair pattern 78 is made up of two straight segments 80 and 82. An intersection of the segments 80 and 82 defines a point 84 that can be tracked. Over time the point 84 may drift due to thermal environment changes, such as changes in ambient air temperature, in the environment in which the laser projector is being used. For example, at a time 1 the intersection of the segments 80 and 82 may define a point 84' at a first location. In the event of thermal environment changes, at a later time 2 the intersection of the segments 80 and 82 may define a point 84" that has drifted to a second location that is different from the first location. The drift can be monitored as desired to determine if a tracker within the projector is appropriately compensating for the drift.

Figure 9:
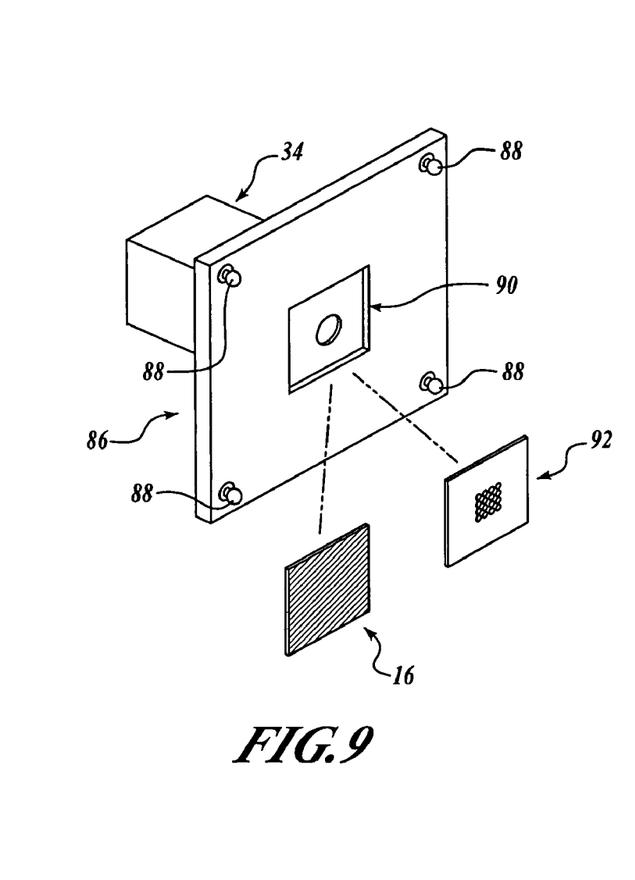
Figure 10:
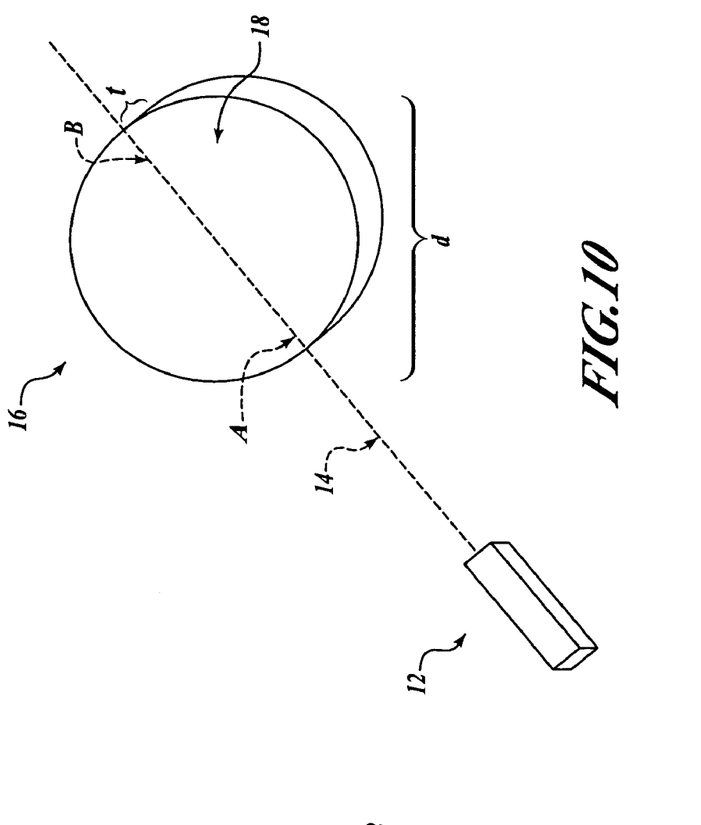

Referring now to FIG. 9, accuracy of the projector can be determined. A rigid plate 86 has several reference points 88, such as tooling ball locators. The plate 86 defines a recessed pocket 90 that is configured to receive the imaging screen 16 or a similarly-sized calibration grid 92, such as a grid of chrome-on-glass dots or any other acceptable target pattern defining a coordinate system. The camera 34 is mounted to the plate 86. The calibration grid 92 is received within the recessed pocket 90 (that is, instead of the imaging screen 16 being received within the recessed pocket 90).

The coordinate system defined by the calibration grid 92 is measured relative to the reference points 88. For the exemplary calibration grid 92 that is a grid of chrome-on-glass dots, an optical comparator suitably is used to establish the location of the dots with respect to the edges of the glass. Then, a coordinate measuring machine (CMM) suitably is used to establish the edges of the glass with respect to the reference points 88. The camera 34 is then calibrated to the calibration grid 92, such that image pixel locations in 3-dimensional space are known relative to the reference points 88. This can be done through a piecewise linear mapping or any of several other known methods for planar camera calibration, such as Affine transformation, Perspective transformation, Look up table (LUT), or the like.

The calibration grid 92 is removed from the recessed pocket 90 and the imaging screen 16 is received within the recessed pocket 90. The rigid plate 86 and the camera 34 can then be positioned arbitrarily in space and an external 3-dimensional metrology system (not shown), such as without limitation a laser tracker, can be used to locate the reference points 88 in space. The laser projector is then programmed to plot an image (such as without limitation a cross-hair) at a known location on the imaging screen 16 relative to the reference points 88. The camera 34 can then independently measure accuracy of the projection, and advantageously accuracy statistics can be determined for the laser projector.

Referring now to FIG. 10, quality of tuning of galvanometers (not shown) of the laser projector 12 can be determined. A diagonal line, such as a line defining around a 45 degree angle, is projected on the imaging screen 16. A diagonal line of around 45 degrees is well-suited for a diagnostic tool for tuning the galvanometers (not shown) to steer the laser beam 14. Exposure is set to record two sweeps of the laser beam 14—one sweep from a point A to a point B, and another sweep from the point B to the point A. Width of the image 18 of the laser beam 14 indicates quality of tuning of the galvanometer (not shown). The galvanometers can then be tuned to minimize width of the image 18 of the laser beam 14, thereby indicating optimal tuning for the projector 12.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for evaluating performance of a projector, the system comprising:
   a housing;
   a plate mounted on the housing, wherein the plate defines a plurality of physical reference points and the plate is configured to interchangeably receive:
      a calibration grid including a target pattern defining a coordinate system relative to the plurality of physical reference points; and
      an imaging screen, the imaging screen having first and second surfaces and configured to produce on the first and second surfaces an image of a pattern projected on the first surface;
   a camera coupled to the plate, the camera configured to:
      calibrate to the coordinate system defined by the target pattern such that image pixel locations of the camera are determinable relative to the plurality of physical reference points; and
      capture from the second surface of the imaging screen the image of the pattern projected on the first surface; and an image analyzer configured to receive the captured image from the camera and to analyze the received captured image.

2. The system of claim 1, wherein the imaging screen includes a pane of glass, wherein one of the first and second surfaces is grit blasted, and wherein the other of the first and second surfaces is not grit blasted.

3. The system of claim 2, wherein the grit blast includes around 220 grit blast.

4. The system of claim 1, wherein the imaging screen includes a holographic filter.

5. The system of claim 1, further comprising a filter interposed between the imaging screen and the camera.

6. The system of claim 5, wherein the filter includes a neutral filter.

7. The system of claim 5, wherein the filter includes a passband filter.

8. The system of claim 1, further comprising a lens interposed between the imaging screen and the camera.

9. The system of claim 1, wherein the camera includes a charge coupled device chip.

10. The system of claim 1, wherein the camera includes a CMOS chip.

11. The system of claim 1, wherein the image analyzer is configured to detect edges of the received captured image.

12. A method for evaluating projector performance, the method comprising:
   disposing a calibration grid at a plate mounted to a housing, wherein the plate defines a plurality of physical reference points and the plate is configured to interchangeably receive the calibration grid and an image screen, wherein the calibration grid includes a target pattern defining a coordinate system relative to the plurality of physical reference points;
   capturing an image of the calibration grid to calibrate a camera coupled to the plate to the coordinate system defined by the target pattern such that image pixel locations of the camera are determinable relative to the plurality of physical reference points;
   removing the calibration grid;
   disposing the image screen at the plate, the image screen having first and second surfaces and configured to produce on the first and the second surfaces an image of a pattern projected on the first surface;
   using the camera to capture, from the second surface of the imaging screen, an image of the pattern projected onto the first surface of the imaging screen from a projector;
   sending the captured image to an image analyzer; and
   using information from the image analyzer to evaluate performance of the projector.

13. The method of claim 12, wherein the projector traces the pattern using a laser beam.

14. The method of claim 12, further comprising filtering the image from the second surface of the imaging screen.

15. The method of claim 14, wherein filtering includes attenuating substantially all frequencies within a visible light spectrum.

16. The method of claim 14, wherein filtering includes attenuating frequencies outside a set of frequencies that make up the image.

17. The method of claim 12, further comprising focusing the image from the second surface of the imaging screen.

18. The method of claim 12, wherein the image analyzer further measures accuracy of the projector in projecting the image on the imaging screen relative to the plurality of physical reference points.

19. The method of claim 12, wherein the image analyzer further determines a width of a diagonal line of the image to indicate tuning of a laser projector.

20. The system of claim 1, wherein the housing is substantially opaque.

21. The system of claim 1, wherein the camera comprises a digital measuring microscope.

* * * * *

UNITED STATES PATENT AND TRADEMARK OFFICE
CERTIFICATE OF CORRECTION

PATENT NO.      : 7,577,296 B2                                    Page 1 of 1
APPLICATION NO. : 10/769065
DATED           : August 18, 2009
INVENTOR(S)     : Easley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Seventh Day of September, 2010

David J. Kappos
*Director of the United States Patent and Trademark Office*